Sept. 15, 1970   A. KAMIN ET AL   3,528,700
ADJUSTABLE CLAMP AND SPRING ARRANGEMENT FOR SEAT SUPPORT
Filed March 27, 1968
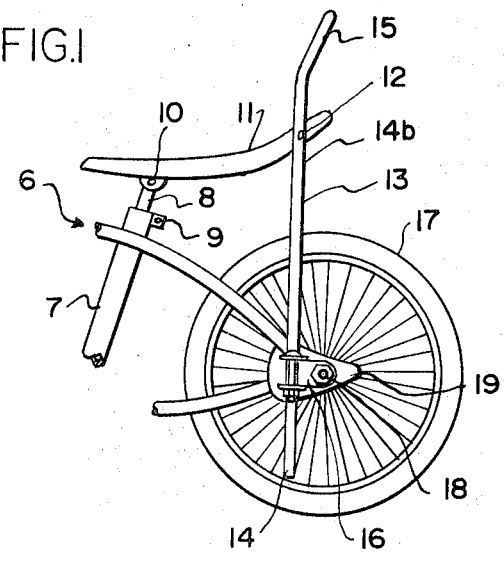
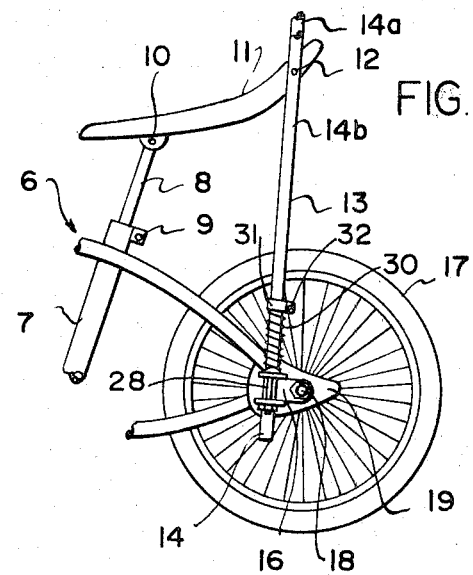
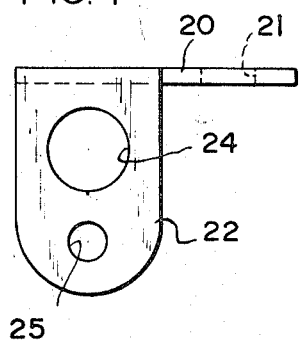
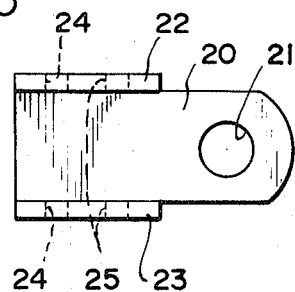
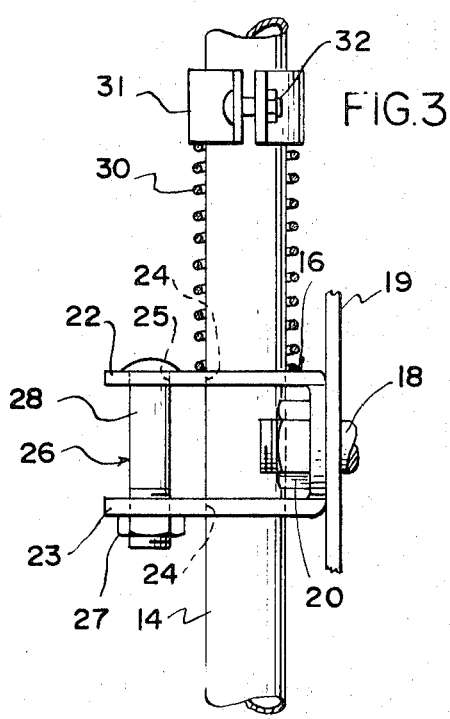
INVENTORS
ALBERT KAMIN
CARL P. JANU
ATTORNEYS.

United States Patent Office 3,528,700
Patented Sept. 15, 1970

3,528,700
ADJUSTABLE CLAMP AND SPRING ARRANGEMENT FOR SEAT SUPPORT
Albert Kamin, 3450 Lake Shore Drive, Chicago, Ill., and Carl P. Janu, 1205 S. Kemman, La Grange Park, Ill. 60525
Filed Mar. 27, 1968, Ser. No. 716,467
Int. Cl. B62j 1/02
U.S. Cl. 297—211   12 Claims

ABSTRACT OF THE DISCLOSURE

This invention relates to bicycle accessories and consists of a pair of brackets mounted on the rear wheel axle for receiving the seat rear support bars. The brackets permit adjustment of the height of the seat to a plurality of positions. In addition, springs may be arranged around the seat support bars to provide a shock absorption effect to the seat while permitting the seat support bars to freely guide on the brackets against the springs.

This invention relates to bicycle components and is more particularly directed to an adjustable clamp for supporting the seat support bar of a bicycle in one of a plurality of positions.

Heretofore difficulty had been encountered in adjusting the seat of a bicycle, particularly the type of bicycle utilizing the elongated seat support bar known in the trade as a "sissy" bar. The prior art seat support bars were drilled in two or more locations to permit mounting of the bar to the axle shaft of the rear wheel of the bicycle. Thus, the seat and bar could be located in only two or three positions relative to the axis of the rear wheel of the bicycle. As is known, riders of bicycles are of different heights and when the "sissy" bar arrangement is employed with the "high rise" handle bars, the adjustability of the bar to only two positions did not accommodate the riders of heights and leg lengths other than those riders comfortable in the two or three positions permitted by the drilled "sissy" bar prior art arrangements.

By employment of the present invention wherein the "sissy" bar may be adjusted in a variety of positions, these problems and difficulties, among others, of the prior art are substantially overcome. In accordance with the present invention, an integral one piece clamp bracket is mounted on each side of the axle of the rear wheel of a bicycle and the two legs of the "sissy" bar are passed through a pair of holes or apertures formed in the brackets and means are provided to secure the legs of the "sissy" bar in the brackets. The securing means permit location of the "sissy" bar legs in a plurality of positions to provide for the necessary adjustment to accommodate riders of the bicycle of different leg lengths. The necessity for drilling holes in the "sissy" bar is eliminated and a simple bracket arrangement which is useable on either side of the axle of the rear wheel is provided.

In accordance with another aspect of this invention, the brackets may each be employed as bottom stop means in conjunction with top stop means spaced therefrom and fixedly and adjustably carried by the leg of the seat support bar as for limiting movement of spring means circumscribing each leg of the seat support bar. The brackets in this modification are not employed to clamp, lock or secure the legs in position. Instead the legs of the seat support bar slide freely through guide apertures in the brackets to permit the desired vertical movement of the bar against the spring means to provide the seat with a degree of "spring action."

It is, therefore, an object of the present invention to provide new and improved means for adjusting the height of a "sissy" bar or seat support bar for the seat of a bicycle.

It is another object of the present invention to provide such a seat support which is adjustable to vary the position of the seat in more than three positions.

Still another object of the present invention is to provide a simple rear wheel axle mountable bracket for clamping seat support bars of bicycles in one of a plurality of locations to adjust the position of the seat of the bicycle.

A further object of the present invention is to provide a seat support arrangement for a bicycle which will provide a degree of spring action to the seat and which may utilize the bracket and seat support arrangement of the present invention.

These and other objects, features and advantages of the present invention will become readily apparent when considered in conjunction with the accompanying drawings illustrating a preferred embodiment of the present invention, wherein like reference numerals refer to like and corresponding parts, and wherein:

FIG. 1 is a side elevational view of a rear wheel, seat support and seat of a bicycle, partially broken to facilitate illustration and showing the bracket of the present invention holding the support bar in a first position.

FIG. 2 is a side elevational view of the seat support bar, bracket and rear wheel of a modification of the present invention partially broken to facilitate illustration and showing a bracket of the present invention supporting a leg of the seat support bar.

FIG. 3 is an enlarged fragmentary view of the seat support bar and bracket of FIG. 2 utilized with a spring and upper stop means.

FIG. 4 is a side elevational view of the bracket of FIG. 1.

FIG. 5 is a top elevational view of the bracket of FIG. 4.

Referring now to FIGS. 1 and 2 there is shown a bicycle body frame partially broken and indicated by the numeral 6, a center support member 7 of which slidably carries a front seat support rod 8 which is provided to telescope in the member 7. The rod 8 is locked in position by locking means 9 relative to the member 7.

The rod 8 is pivotally connected by means at 10 to a seat or saddle 11 and supports the front or lefthand side of the seat 11. The seat 11 is also pivotally mounted by means 12 to the seat support bar 13 to permit adjustment of the seat 11 about means 10 and 12.

The seat support bar 13 includes two spaced, elongated legs 14a and 14b, one of which is shown in FIG. 1, which extend from a lower end 14 to an upper bight portion 15 which joins the two legs 14a and 14b. The bight portion 15 has been broken away to illustrate the two legs 14a and 14b, 14a being the leg portion 14a which is located on the other side of the saddle from leg 14b. The support 13 is generally tubular in shape and is drilled to receive the seat pivot support means 12.

Each leg portion 14a and 14b is held in a separate clamp bracket 16 constructed in accordance with the present invention. One clamp bracket 16 is mounted on the axle 18 on one side of the rear wheel 17 and the other clamp bracket 16 (not shown) is mounted on the axle 18 on the other side of the wheel 17. Clamp brackets 16 are interchangeable to provide simplicity in construction and stocking of a single part.

In FIG. 1 the seat 11 is shown disposed in a substantially horizontal plane and it will be appreciated that locating of the saddle in any position will depend upon the relative adjustment of the height of the rod 8 and seat support 13 and pivoting of the seat about means 10 and 12.

In FIG. 2 the seat 11 is shown in a different place of adjustment which is more vertically oriented than the seat as shown in FIG. 1. It will be observed that in FIG. 2 the lower end 14 of the leg 14b of the support bar 13 is located closer to the bracket 16 than the end 14 of the support bar 13, as shown in FIG. 1.

FIGS. 1 and 2 illustrate that the support bar 13 and brackets 16 arrangement of the present invention permits adjustment of the seat 11 in a plurality of positions and permits detailed adjustments of the seat 11 to fit the height and leg length of different sized riders. It is observed that the legs 14a and 14b of the seat support bar do not have any holes drilled therein adjacent the axle 18 and that the bar 13 is located in a vertical plane other than the plane of the axle 18 of the rear wheel. The brackets 16 therefore may be located in planes other than a weight bearing plane directly on the axle 18 of the wheel 17.

Referring to FIGS. 3 through 5, the details of a bracket 16 constructed in accordance with the present invention are shown. It is understood that two brackets 16 are used in the practice of the present invention; however, the details of only one such bracket will be described below.

In FIG. 3 the axle 18 is shown broken away and the bracket 16 is shown held to the axle plate 19 by the nut 20. The bracket 16 as shown in FIG. 4, has a flat, substantially rectangular body portion 20 through which an aperture or hole 21 for passage of the axle 18 is provided. The body 20 also has, as shown in FIG. 5, located at a position remote from the hole 21 and extending normal therefrom depending flanges 22 and 23. Flanges 22 and 23 are substantially flat, parallel, and flexible to an extent required for purposes hereinafter explained. The parallel legs 22 and 23 are each provided with an aperture 24 through which the leg 14a or 14b of the seat support 13 passes. The spaced flanges 22 and 23 provide a maximum degree of support for the legs 14a and 14b of the seat support bar 13.

Each of the flanges 22 and 23 is also provided with a hole 25. These holes 25 are in axial alignment with each other and in vertical alignment, as shown in FIG. 4, with the holes 24. The holes 25 are provided to receive lock means 26 which as shown in FIG. 3 comprise a nut 27 and a headed bolt 28. The nut 27 and bolt 28, when tightened, will flex the legs 22 and 23 towards each other a sufficient distance so that the surfaces of the holes 24 engage and clamp the leg 14a or 14b of the seat support bar 13 with sufficient force to hold the seat support bar 13 in position against the weight of a rider sitting on the seat 11.

It will be readily appreciated that the bracket arrangements 16 of the present invention are interchangeable and can be easily mounted to both sides of the rear wheel axle 18 of existing bicycles without the necessity for removing any of the parts of the rear wheel axle, except the nuts 20. The seat support bar 13 may have its legs 14a and 14b slideably passed through the apertures 24 of the brackets 16 and the nuts 27 tightened to hold the legs 14a and 14b in the brackets 16 at a plurality of positions for adjusting the height of the seat 11 relative to the axle 18.

Referring again to FIGS. 2 and 3, a modification of the present invention is shown in which the brackets 16 are not employed to clamp, lock or secure the legs 14a and 14b of the seat support bar 13. In this embodiment the bracket 16 serves as guide means for the legs 14 which are freely slideable in the apertures 24 and 24 formed in the flanges 22 and 23, respectively. The flanges 22 of the brackets 16 also serve as stop means for a compression spring 30 which circumscribes the leg 14. The spring 30 is bottomed at its upper end against upper stop means 31 which may, as shown in enlargement in FIG. 3, be an adjustable clamp or split ring. The split ring 31 is adjustable to permit positioning of the seat 11 and bar 13 against the action of the spring 30 to facilitate adjustment of the height of the seat to fit the leg lengths of a particular rider. Nut and bolt means 32 may be employed to fixedly secure the clamp 31 on the leg of the seat support bar 13.

In this embodiment the lock or clamp means 26 are not tightened to hold the legs of the seat support bar 13 in a fixed position. In this modification the seat 11 and support bar 13 are provided with a spring action by virtue of the arrangement of the upper clamp 31, spring 30 and bracket flange 22. Thus, a rider of the bicycle may in accordance with the present invention either clamp the legs 14a and 14b in the brackets 16 by means of the lock or clamp means 26 or the rider may provide the seat 11 with a spring action by loosening of the lock or clamp means 26 to permit free response by the spring 30 to the action of the rear wheel to the weight of the rider sitting on the seat 11. Adjustment of the pivot means 10 and 12 may be necessary to realize complete response of the rider to the action of the spring 30.

Thus, the bracket, spring and upper stop means of the present invention provide a new, novel arrangement permitting the positioning of the seat support bar in one of a plurality of fixed positions while also permitting a shock absorbing spring action to the seat by the simple expedient of locking or unlocking of the brackets on the legs of the seat support bar.

Although, various minor modifications and alterations of the present invention will be readily apparent to those versed in the art, it should be understood that what is desired to be embodied within the scope of the patent warranted hereon, are all such embodiments as reasonably and properly fall within the scope of the contribution to the art hereby made.

We claim:

1. A bicycle assembly comprising a frame including a rear axle, a rear wheel rotatably mounted on said rear axle, elongated seat support means, a seat movable and pivotally carried adjacent one end thereof by said frame, and movably and pivotally carried at its opposite end by said elongated seat support means, said seat support means including an elongated member having a pair of spaced legs joined by a bight portion adjacent said seat, said legs spanning said rear wheel, mounting means carried by said frame adjacent said rear wheel for carrying said legs of said seat support means adjacent the lower ends thereof, said mounting means including a pair of brackets carried by said frame adjacent said axle on opposite sides of said rear wheel, said brackets further including a body portion mountable on said rear axle, a pair of spaced flanges extending outwardly in normal relation to said body portion, each of said flanges having a first aperture in axial alignment for the passage therethrough of one of said legs and each of said flanges having a second aperture therein, and means carried by said second apertures in said brackets for securing said seat against pivotal movement relating to said frame and said seat support means.

2. The assembly of claim 1 wherein said means for adjustably holding said leg to said bracket is a threaded bolt and nut.

3. The assembly of claim 1 wherein said means for adjustably holding said leg to said bracket is a threaded bolt and nut, and wherein said body portion is apertured to receive said rear wheel axle, said axle is threaded, and a nut secures said bracket to said axle.

4. The assembly of claim 3 wherein said seat support means is tubular.

5. A bicycle assembly including a frame supported upon a rotatable front wheel and a rotatable rear wheel, a seat adjustably and pivotally carried adjacent one end thereof by the frame, the seat being adjustably and pivotally carried adjacent another end thereof by elongated seat support means, the seat support means including an elongated member having a pair of spaced legs joined by a bight portion adjacent said seat, said bight portion bridging said rear wheel and said legs spanning at least a portion of said rear wheel in a generally radial direction, said legs being adjustably carried by mounting means on the frame, said mounting means including a pair of brackets carried by the frame adjacent the axle of the rear wheel and on opposite sides of the axle and each bracket including at least one aperture for receiving one of said legs, means carried by the brackets for the selective engagement of the legs to control the pivotal movement of the seat with respect to the frame and to the seat support means, spring bottoming means carried by said seat support means in spaced relation to said mounting means, and spring means disposed between said spring bottoming means to permit reaction of said spring means to movement of said seat support means, when said engagement means is selectively disengaged from holding said seat support means in a fixed position relative to said frame whereby said legs are freely movable in said brackets.

6. The assembly of claim 5 wherein said spring means is a pair of springs, one of said springs circumscribing one of said legs, and the other of said springs circumscribing the other of said legs, and wherein said spring bottoming means is a pair of clamp members, one of said clamp members being carried by one of said legs and the other of said clamp members being carried by the other of said legs, and wherein said legs are freely movable through said apertures.

7. The assembly of claim 6 wherein said clamp members are movably carried by said legs and include means for fixedly securing the clamp members to the legs in a plurality of positions.

8. The assembly of claim 7 wherein said springs are each bottomed at their other end against one of said brackets.

9. A bicycle assembly including a frame, a rear wheel rotatably mounted on an axle carried by said frame, a seat movably and pivotally carried adjacent one end by said frame and adjacent one end of elongated seat support means, said seat support means including an elongated member having a pair of spaced legs spanning said rear wheel and joined by a bight portion adjacent said seat and adjacent its opposite end being movably carried by mounting means carried by said frame, means for securing said seat against pivotal movement relative to said frame and said seat support means, said mounting means comprising a pair of brackets carried by said frame adjacent said axle on opposite sides of said wheel, each of said brackets including at least one aperture for receiving one of said legs, spring bottoming means clamped to said seat support means in spaced relation to said mounting means, and spring means disposed between said spring bottoming means and said mounting means to permit reaction of said spring means to movement of said seat support means.

10. The assembly of claim 9 wherein said spring means is a pair of springs, one of said springs circumscribing one of said legs, and the other of said springs circumscribing the other of said legs and wherein said spring bottoming means is a pair of clamp members, one of said clamp members being carried by one of said legs and the other of said clamp members being carried by the other of said legs, and wherein said legs are freely movable through said apertures.

11. The assembly of claim 10 wherein said clamp members are movably carried by said legs and include means for fixedly securing the clamp members to the legs in a plurality of positions.

12. The assembly of claim 11 wherein said springs are each bottomed at their other end against one of said brackets.

References Cited

UNITED STATES PATENTS

| 603,735 | 5/1898 | Porter. | |
|---|---|---|---|
| 924,541 | 6/1909 | Duck. | |
| 1,717,056 | 6/1929 | Mesinger. | |
| 2,205,677 | 6/1940 | Tracy | 292—275 |
| 2,467,676 | 4/1949 | Labine | 297—211 |
| 2,637,313 | 5/1953 | White | 248—410 |
| 3,408,090 | 10/1968 | Fritz et al. | 280—287 X |

FOREIGN PATENTS

| 141,949 | 11/1948 | Australia. |
|---|---|---|

OTHER REFERENCES

American Bicycle and Motorcyclist Magazine; June 1967; p. 16.

KENNETH H. BETTS, Primary Examiner

U.S. Cl. X.R.

280—283, 289; 248—410